United States Patent
Shichino (10) Patent No.: US 8,335,840 B2
(45) Date of Patent: Dec. 18, 2012

(54) ADDRESS DISTRIBUTION SYSTEM AND METHOD AND PROGRAM FOR THE SAME

(75) Inventor: Nobuyuki Shichino, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 442 days.

(21) Appl. No.: 12/320,285

(22) Filed: Jan. 22, 2009

(65) Prior Publication Data

US 2009/0187644 A1   Jul. 23, 2009

(30) Foreign Application Priority Data

Jan. 22, 2008  (JP) .................................. 2008-011707
Dec. 9, 2008   (JP) .................................. 2008-313669

(51) Int. Cl.
*G06F 15/177* (2006.01)

(52) U.S. Cl. ........ 709/220; 709/221; 709/222; 709/224; 709/226; 709/245; 714/4.11; 714/6.3; 711/E12.085; 710/9; 710/74

(58) Field of Classification Search .......... 709/220–222, 709/224, 226, 245; 710/9, 74; 711/E12.085, 711/E12.087; 714/4.11, 6.3
See application file for complete search history.

(56) References Cited

U.S. PATENT DOCUMENTS

| | | | | |
|---|---|---|---|---|
| 5,812,819 A * | 9/1998 | Rodwin et al. | ................... | 703/23 |
| 6,272,113 B1 * | 8/2001 | McIntyre et al. | ............. | 370/248 |
| 6,427,170 B1 * | 7/2002 | Sitaraman et al. | ............. | 709/226 |
| 6,728,232 B2 * | 4/2004 | Hasty et al. | ................... | 370/338 |
| 6,826,611 B1 | 11/2004 | Arndt | | |
| 7,024,548 B1 * | 4/2006 | O'Toole, Jr. | ...................... | 713/1 |
| 7,058,731 B2 * | 6/2006 | Kodama | ............................. | 710/5 |
| 7,334,252 B1 * | 2/2008 | Millet et al. | ................... | 725/111 |
| 7,526,671 B2 * | 4/2009 | Kawamoto et al. | ............ | 714/4.1 |
| 7,680,928 B2 * | 3/2010 | Lean et al. | ..................... | 709/224 |
| 7,885,278 B2 * | 2/2011 | Zhu | .............................. | 370/401 |
| 2003/0101275 A1 * | 5/2003 | Maciel | .......................... | 709/235 |
| 2003/0233502 A1 * | 12/2003 | Murotani et al. | ............... | 710/74 |
| 2004/0243722 A1 | 12/2004 | Matsui | | |
| 2005/0021855 A1 * | 1/2005 | Wang et al. | .................... | 709/245 |
| 2005/0025165 A1 * | 2/2005 | Lee et al. | ....................... | 370/401 |
| 2005/0152305 A1 * | 7/2005 | Ji et al. | ........................... | 370/328 |
| 2006/0104214 A1 * | 5/2006 | Borella | .......................... | 370/252 |
| 2006/0168192 A1 * | 7/2006 | Sharma et al. | ................. | 709/224 |
| 2006/0195568 A1 * | 8/2006 | Staurnes et al. | ............... | 709/224 |
| 2006/0206934 A1 * | 9/2006 | Ammirata | ........................ | 726/15 |

(Continued)

FOREIGN PATENT DOCUMENTS

JP   2001-36550   2/2001

(Continued)

OTHER PUBLICATIONS

Japanese Office Action issued Apr. 27, 2010 in corresponding Japanese Patent Application 2008-313669.

(Continued)

*Primary Examiner* — Alina N. Boutah (74) *Attorney, Agent, or Firm* — Fujitsu Patent Center (57) ABSTRACT

An internal unit acquires a first internal use address and uses the first internal use address to acquire a second internal use address. When receiving a notification of change of IP address from the main unit, the internal unit uses the second internal use address as a first internal use address to acquire a new second internal use address from the main unit.

4 Claims, 6 Drawing Sheets

U.S. PATENT DOCUMENTS

| | | | |
|---|---|---|---|
| 2006/0221955 A1* | 10/2006 | Enright | 370/389 |
| 2008/0082642 A1* | 4/2008 | Wu | 709/222 |
| 2008/0106399 A1* | 5/2008 | Yaqub et al. | 340/539.11 |
| 2008/0313255 A1* | 12/2008 | Geltner et al. | 709/201 |
| 2009/0037934 A1* | 2/2009 | Sullivan | 719/317 |
| 2009/0086728 A1* | 4/2009 | Gulati et al. | 370/389 |
| 2009/0213752 A1* | 8/2009 | Butti et al. | 370/254 |

FOREIGN PATENT DOCUMENTS

| | | |
|---|---|---|
| JP | 2001-203806 | 7/2001 |
| JP | 2002-190811 | 7/2002 |
| JP | 2003-78541 | 3/2003 |
| JP | 2003-244173 | 8/2003 |
| JP | 2004-266415 | 9/2004 |
| JP | 2006-295532 A | 10/2006 |
| JP | 2007-174406 A | 7/2007 |

OTHER PUBLICATIONS

"Japanese Office action" mailed by JPO on Aug. 17, 2010, in connection with JP Patent Application No. 2008-313669. Partial English-language translation provided.

* cited by examiner

ADDRESS DISTRIBUTION SYSTEM AND METHOD AND PROGRAM FOR THE SAME

CROSS-REFERENCE TO RELATED APPLICATIONS

This application is based upon and claims the benefit of priority of the prior Japanese Patent Application No. 2008-11707, filed on Jan. 22, 2008 and Japanese Patent Application No. 2008-313669, filed on Dec. 9, 2008, the entire contents of which are incorporated herein by reference.

FIELD

The present invention relates to an address distribution system and method for distributing addresses to units connected to a network in a system and a program for the same.

BACKGROUND

For example, a storage system including an array of magnetic disks has a main unit and is connected to a plurality of internal units connected by an internal network inside the storage system. Each internal unit includes a control circuit controlling a magnetic disk. The main unit controlling the plurality of the internal units is connected to an external network including a monitoring terminal.

The main unit acquires information from the plurality of the internal units in the storage system and confirms the statuses of the internal units by communication by Ethernet® in the storage system. Furthermore, the main unit has to communicate with the monitoring terminal, i.e., a computer, outside of the storage system, so also communicates with the outside of the storage system by Ethernet®. For this reason, it is necessary to ensure that the Internet Protocol (IP) address of the main unit used in communication at the outside of the storage system and the IP addresses of the internal units at the inside of the storage system do not conflict.

In general, to avoid conflict of IP addresses, IP addresses in a network are dynamically assigned using the Dynamic Host Configuration Protocol (DHCP). When using the DHCP for network control in a storage system, each internal unit requests an IP address from the main unit and borrows an IP address with a time limit of use. However, the following problem arises when using the DHCP between the main unit and the internal units in the storage system.

The problem at the time of use of the DHCP is that even if the main unit wants to change an IP address of an internal unit lent by the main unit, it is not possible to immediately change it. The reason is that the main unit has to receive a lending request from the internal unit in order to change the IP address. That is, it is not possible to control an IP address in real time voluntarily from the main unit side. In other words, the main unit cannot change the IP address of an internal unit at any time and without receiving for a lending request from the internal unit.

If it is not possible to change the IP address of an internal unit of a storage system in real time, for example, it would not be possible to dynamically change the external use IP address of the main unit from the monitoring terminal at the outside of the storage system. This has the result of lowering the commercial value of the storage system. (For related art, see Japanese Laid-Open Patent Publication (A) No. 2002-190811.)

SUMMARY

According to an aspect of the present invention, an address distribution system comprises a main unit connected to a network in a system and having an internal use address used inside of the network and an external use address used outside of the network and a plurality of internal units each connected to the network, acquiring a first internal use address from the main unit, using the acquired first internal use address to acquire a second internal use address from the main unit, and using the acquired second internal use address to communicate with the main unit, wherein when the main unit sends the plurality of the internal units an address change notification and the plurality of the internal units receive the address change notification, each internal unit uses the second internal use address as the first internal use address and obtains a new second address from the main unit.

According to another aspect of the present invention, an address distribution system comprises a main unit connected to a network in the system and having an internal use address used inside of the network and an external use address used outside of the network and a plurality of internal units each connected to the network, acquiring an address from the main unit, and using the acquired internal use address to communicate with the main unit, wherein when an internal unit does not receive a reply within a predetermined time, the internal unit acquires a new address from the main unit.

The address distribution method is a method relating to each above address distribution system.

The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

The object and features of the present invention will become clearer from the following description of the preferred embodiments given with reference to the attached drawings, wherein.

DESCRIPTION OF EMBODIMENTS

Below, embodiments of the present invention will be explained with reference to the drawings.

Figure 1:
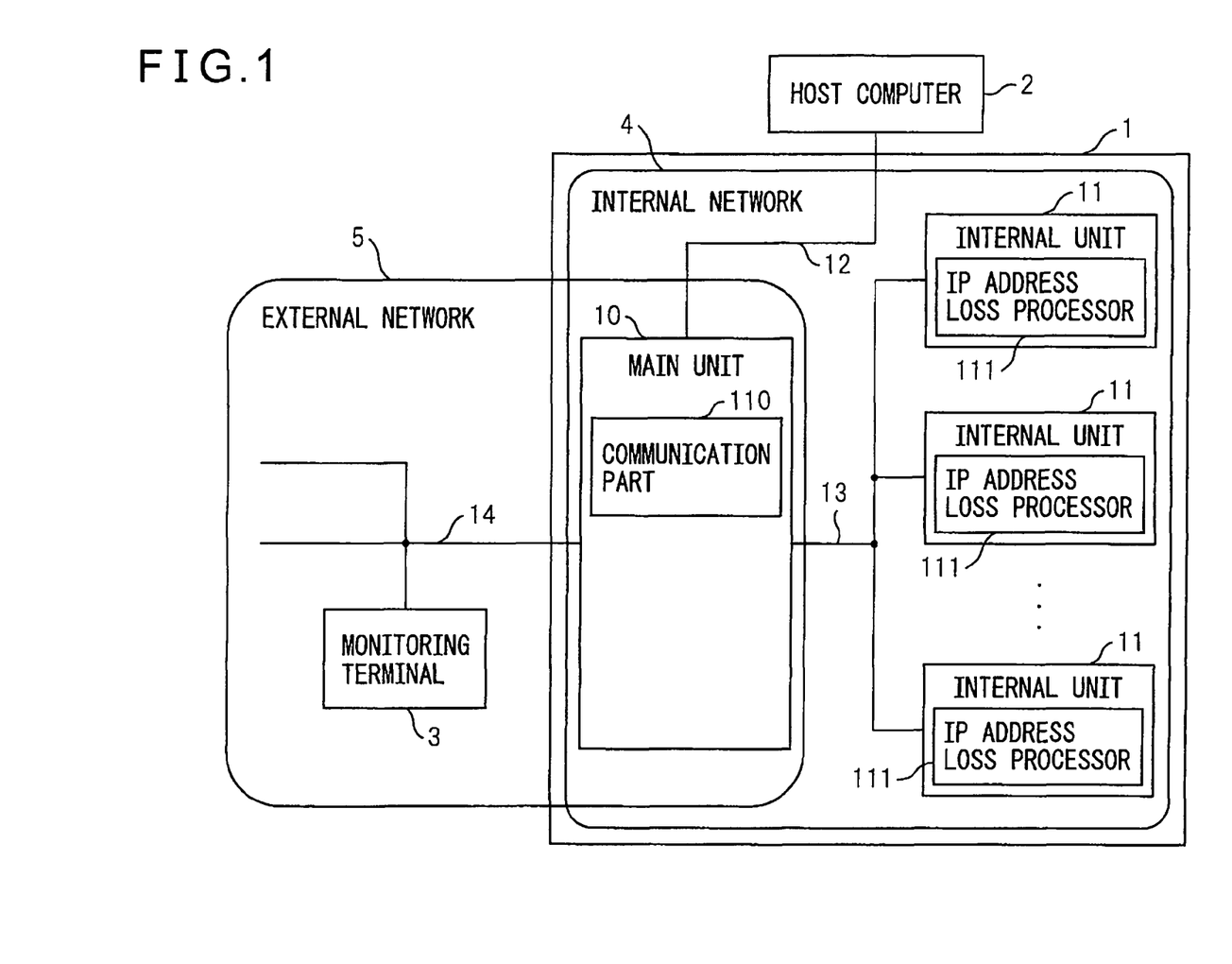
FIG. 1 is a schematic block diagram of an IP address distribution system according to a first embodiment.

FIG. 1 is a view depicting an IP address distribution system in a storage system according to a first embodiment. The IP address distribution system illustrated in FIG. 1 has a main unit 10 and a plurality of internal units 11 in an internal network 4 formed in a storage system 1. For example, a host computer 2 constituted by a mainframe computer or open server is connected to the main unit 10 through a fiber channel 12 etc. Note that the host computer 2 may also be connected to the main unit 10 through an internal unit provided with a communication interface. The main unit 10 in the internal network 4 also belongs to the external network 5. The external network 5 includes a monitoring terminal 3 comprised of a computer at the outside the storage system 1. The main unit 10 is connected to a monitoring terminal 3.

The communication part 110 of the main unit 10 uses IP communications to maintain/manage the plurality of the internal units 11 in the storage system 1 and uses IP communications to notify the state inside the storage system 1 to an external monitoring terminal 3.

The main unit 10 has a CPU, memory, input device, output device, and auxiliary storage device (not shown). The main unit 10 obtains information from the internal units 11, prepares information for confirming the statuses of the internal units 11, and responds to a request for confirmation of status from the monitoring terminal 3. In answer to a request for confirmation of status, the main unit 11 responds if storage system 1 as a whole is normal. If not normal, each internal unit 11 responds if it is normal or not.

The main unit 10 is assigned two IP addresses. One is an internal use IP address, while the other is an external use IP address. The internal use IP address is for the internal network 4 inside the storage system 1. The external use IP address is for the external network 5 outside the storage system 1.

The external use IP address of the main unit 10 can be freely set from the monitoring terminal 3. The monitoring terminal 3 does not have to be aware of the internal use IP address of the main unit 10. Due to this, the design load of the network including the storage system 1 is lightened.

The main unit 10 assigns IP addresses to the plurality of the internal units 11 by the framework of the DHCP included in the OS (Operating System). Specifically, it assigns IP addresses successively to the internal units 11 requesting to acquire IP addresses and sends the IP addresses to the internal units 11.

The internal units 11 monitor their own power statuses and disk statuses etc. and send the main unit 10 information indicating the statuses. Further, the internal units 11 have CPUs, memories, and auxiliary storage devices comprised of nonvolatile memories, magnetic disks (not shown). If necessary, it is also possible to have input devices and output devices. The internal units 11 send and receive data with the host computer 2 via the main unit 10. Note that when there is an internal unit provided with a communication interface with the host computer 2, it is also possible to send and receive data with the host computer 2 through this internal unit.

If introducing the DHCP in the storage system 1, even if there is a change in the settings of the IP addresses of the internal units 11 in the internal network 4 at the inside of the storage system 1, the main unit 10 can use the DHCP and flexibly deal with this by changing the IP addresses of the plurality of the internal units 11. However, the introduction of DHCP gives rise to the following problems.

According to the DHCP, when a internal unit 11 requests an IP address to the main unit 10, the main unit 10 notifies an IP address for the internal network 4 and term of use of the IP address, that is, the lifetime of the IP address, to the internal unit 11. The lifetime of the IP address is notified so as to recover and reutilize the IP address assigned to the internal unit 11 after the lifetime runs out. When a internal unit 11 breaks down before the end of its lifetime and therefore is separated from the internal network 4 and the lifetime of the internal unit 11 ends, the IP address for the internal unit 11 can be reused by a new internal unit 11. The internal unit 11 requests extension of use of an IP address to the main unit 10 before the lifetime runs out. If the extension request is approved, the lifetime of the IP address can be extended.

Due to the specifications of the DHCP, only when an internal unit 11 is requesting extension of an IP address, the main unit 10 can change the IP address of the internal unit 11. However, an internal unit 11 does not request an extension of the IP address until the lifetime of the IP address is about to run out, so sometimes the main unit 10 cannot change the IP address even if desiring to do so. In other words, it is not possible to change an IP address of an internal unit 10 in real time due to circumstances at the main unit 10.

In the present embodiment, the lifetime of the IP address is shortened so that each internal unit 11 sends the main unit 10 a request for extension more frequently. For example, if the lifetime of the IP address is 5 seconds, each internal unit 11 sends a request for extension of use of the IP address to the main unit 10 at the latest at 5 second intervals. Therefore, if the IP address of an internal unit 11 requesting extension is changed, the main unit 10 can notify the change of IP address at intervals of the lifetime, for example, 5 seconds. By shortening the lifetime of the IP address, the opportunities for the main unit 10 to change an IP address of an internal unit 11 become greater and therefore the main unit 10 can change the IP address of an internal unit 11 substantially in real time.

Figure 2:
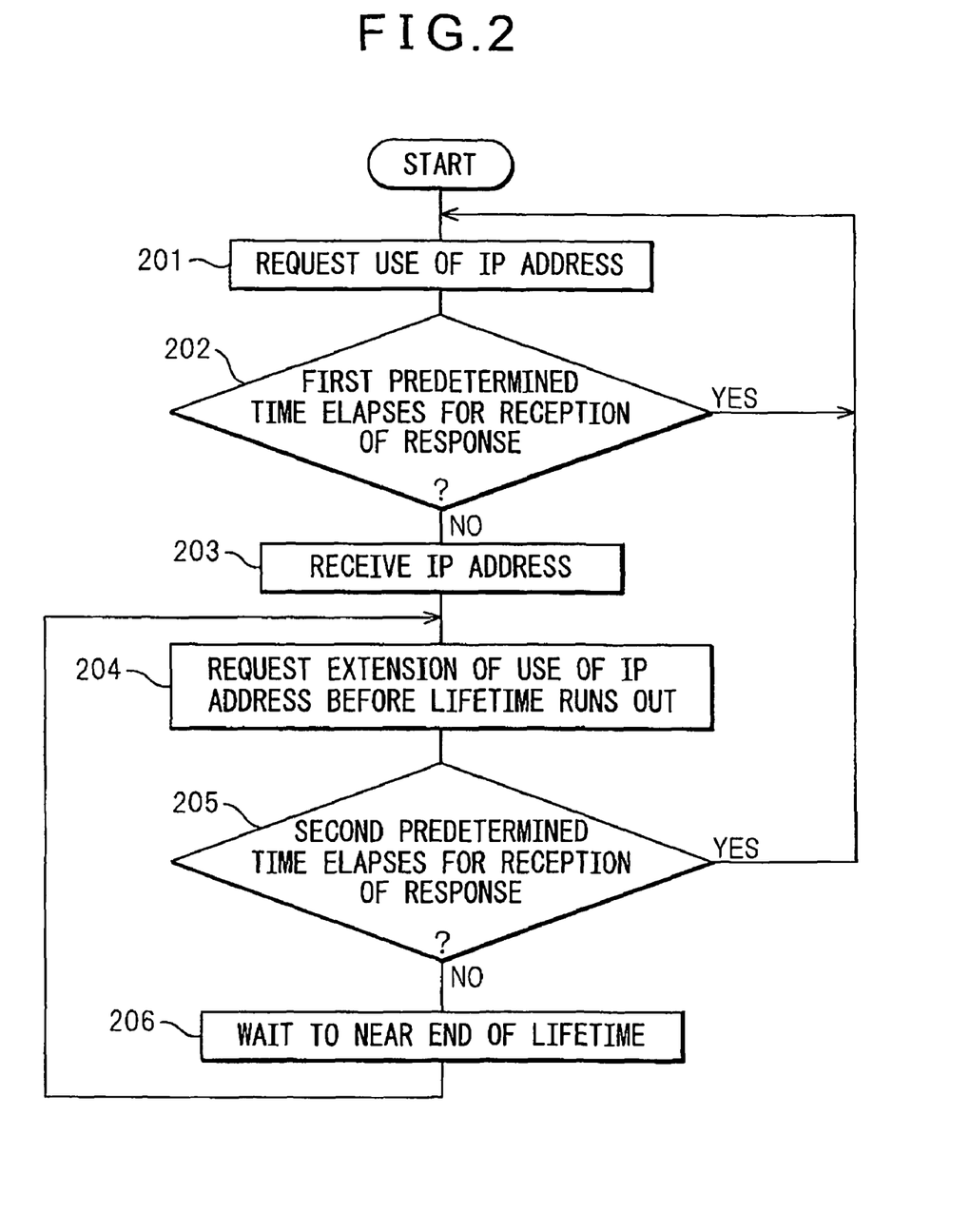
FIG. 2 is a flowchart depicting processing by an internal unit illustrated in FIG. 1.

FIG. 2 is a flowchart illustrating the processing by an internal unit 11 of FIG. 1. The program for the processing of the internal unit 11 can be written by the CPU (not shown) of the internal unit 11 from the auxiliary storage device (not shown) in the internal unit 11 to a memory (not shown) and then run.

When the storage system is started, first at step 201, the internal unit 11 sends the main unit 10 a request for IP address use. At step 202, if the internal unit 11 receives a reply from the main unit 10 within a first predetermined time, it judges that reception of the request is normal, then proceeds to step 203. If the internal unit 11 does not receive a response from the main unit 10 in a first predetermined time, it judges that reception of the request is abnormal, then returns to step 201 where step 201 is executed again. Since the startup time of the main unit required from the power on to startup is longer than the start up time of the internal unit 11, the first predetermined time is slightly longer than the startup time of the main unit 10. The first predetermined time can be freely set by the main unit 10 and is usually set to 4 to 8 seconds.

At step 203, the internal unit 11 receives an IP address from the main unit 10.

At step 204, at the timing before the lifetime of the IP address runs out, the internal unit 11 sends a request for extension for continued use of the IP address to the main unit 10.

At step 205, if the internal unit 11 receives a response of the main unit 10 to the request for extension of use of the IP address within a second predetermined time, it is determined that the request is normally received and the process proceeds to step 206. If the internal unit 11 does not receive a response from the main unit 10 within a second predetermined time, it is determined that the request is not received due to the IP address loss and proceeds to step 201 where the process of step 21 is again executed. That is, at step 201, requests use of an IP address is again requested.

When the lifetime is set to 5 seconds, the second predetermined time is set to 2.50 seconds, ½ of the lifetime from a request for extension of an IP address use under the specifications of the DHCP or 1.67 seconds, ⅓ of the lifetime.

As described above, by shortening the lifetime of the IP address of the internal unit 11, the time until the main unit 10 reassigns the IP address becomes shorter. Therefore, it is possible to respond in substantially real time to a request for change of the external address of the main unit 10 from an external monitoring terminal 3.

In this regard, when it is determined at step 205 that the IP address is lost, the external use IP address of the main unit 10 is often changed by the monitoring terminal 3 in the time period from the previous reception of an extension request of use of the IP address to the new reception of an extension request of use of the IP address. When the external use IP address of the main unit is changed, the main unit 10 changes the own internal use IP address, than newly assigns the IP address of the internal unit 11.

When the internal use IP address of the main unit 10 is changed, the internal unit 11 cannot communicate with the main unit 10 and therefore cannot receive a response from the main unit 10 to the request for extension of use of the IP address currently in use and therefore the IP address is lost.

If shortening the lifetime of the IP address, if the time of the real time clock of the main unit 10 is changed, an IP address may be lost.

For example, at step 203 of FIG. 2, if the real time clock of the main unit 10 is changed in the time period from when an IP address is received from the main unit 10 to before the lifetime runs out, sometimes the IP address is lost. Assume the lifetime of the IP address is set to 5 seconds, and the internal unit 11 receives the IP address from the main unit 10 at step 203 when the real time clock of the main unit 10 becomes exactly 10:00. Assume that after this, at 10:00.01, the real time clock of the main unit 10 is changed to 11:00. In this case, at step 204, even if the internal unit 11 sends a request for extension of use of the IP address at a timing before the lifetime of the IP address runs out, for example 10:00.02 to 10:00.03, the main unit 10 determines that the time was in the past. Therefore, the main unit 10 does not send an IP address to the internal unit 11. Furthermore, the main unit 10 determines that the lifetime has run out at 10:00.05 and ends up discarding the IP address of that internal unit 11, so the IP address of the internal unit 11 ends up being lost.

If not changing the real time clock used in the storage system after startup of the main unit 10, the above-mentioned IP address loss does not occur. However, for recording the status (establishing a log) etc., the real time clock is sometimes matched with the environment. Further, a clock matched with the environment can be freely changed or set.

If there is the possibility of change of the real time clock, it is not possible to use the real time clock of the computer in the storage system 1. The real time clock is used for the management of the lifetime of the IP address, so if the clock is set matching the environment at which the storage system 1 is set, the real time clock will sometimes change discontinuously, the lifetime will suddenly run out, and the IP address will be lost. For this reason, in the time period from a change of time of the real time clock to re-reception of an IP address, communication between the main unit 10 and the internal unit 11 will no longer be possible, the main unit 10 will conclude that the internal unit 11 has broken down, and the monitoring terminal 3 will display that the internal unit 11 has broken down.

To avoid loss of IP addresses due to shortening of the lifetime of the IP addresses, it may be considered to make the lifetime of the IP addresses endless. However, if making the lifetime endless, it is not possible to keep up with changes in the IP addresses. Therefore, separate from requests for extension of use of IP addresses using DHCP, heartbeat monitoring is introduced. This heartbeat monitoring is performed inside the internal unit 11. The system is set so that the heartbeat monitoring is ended at the internal unit 11 when the main unit 10 changes the IP address. The internal unit 11 can recognize the end of heartbeat monitoring as the time of change of the IP address. As a result, it is possible to send a request for extension of use of an IP address using DHCP to the main unit 10.

Figure 3:
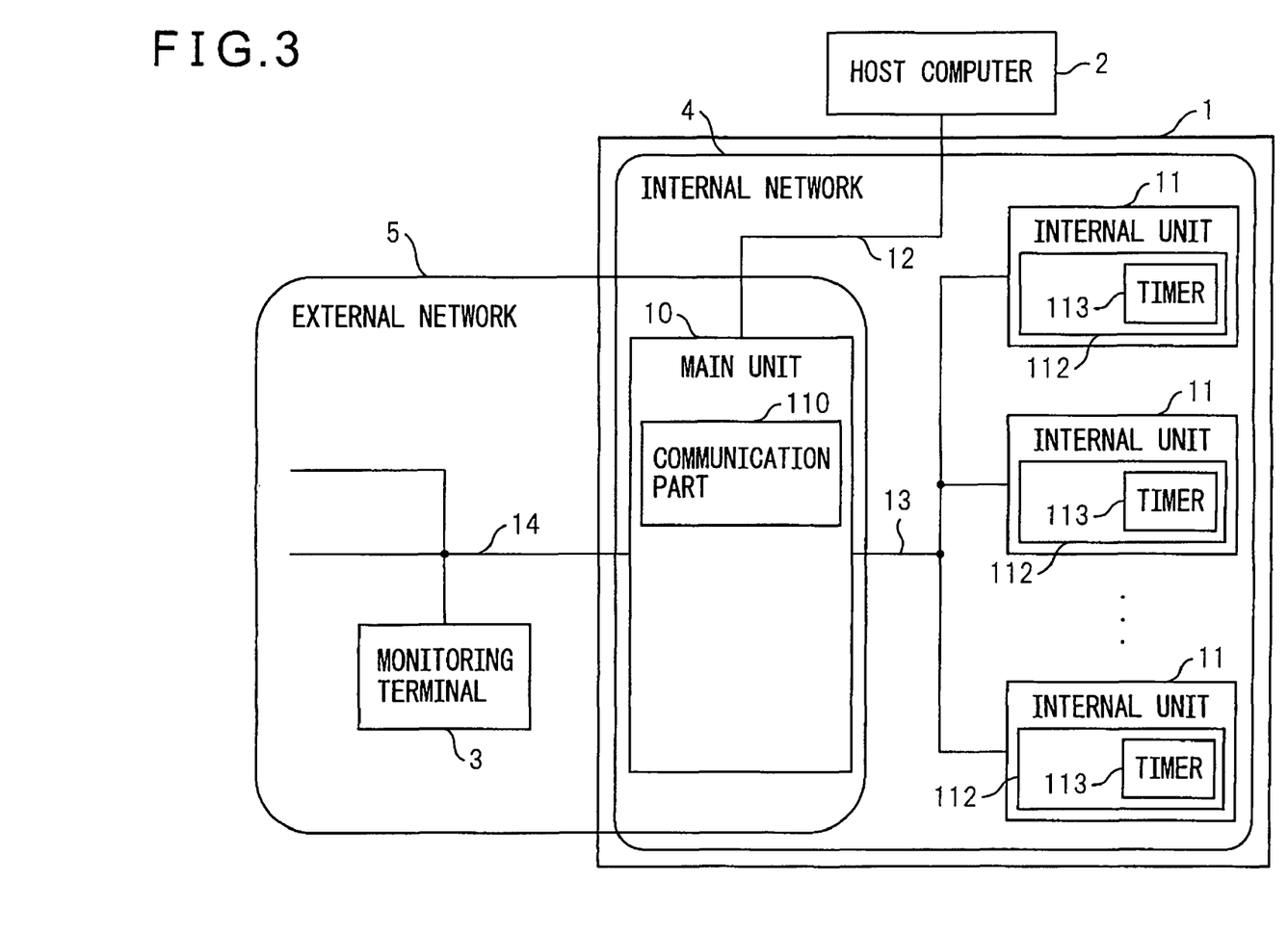
FIG. 3 is a schematic block diagram of an IP address distribution system according to a second embodiment.

FIG. 3 is a schematic block diagram of an IP address distribution system according to a second embodiment. In FIG. 3, components the same as those shown in FIG. 1 are assigned the same reference numerals. The configuration of the second embodiment depicted in FIG. 3 differs from the configuration of the first embodiment depicted in FIG. 1 in the point that an IP address loss processor 112 of each internal unit 11 has a heartbeat monitoring timer 113 to monitor the heartbeat.

Figure 4:
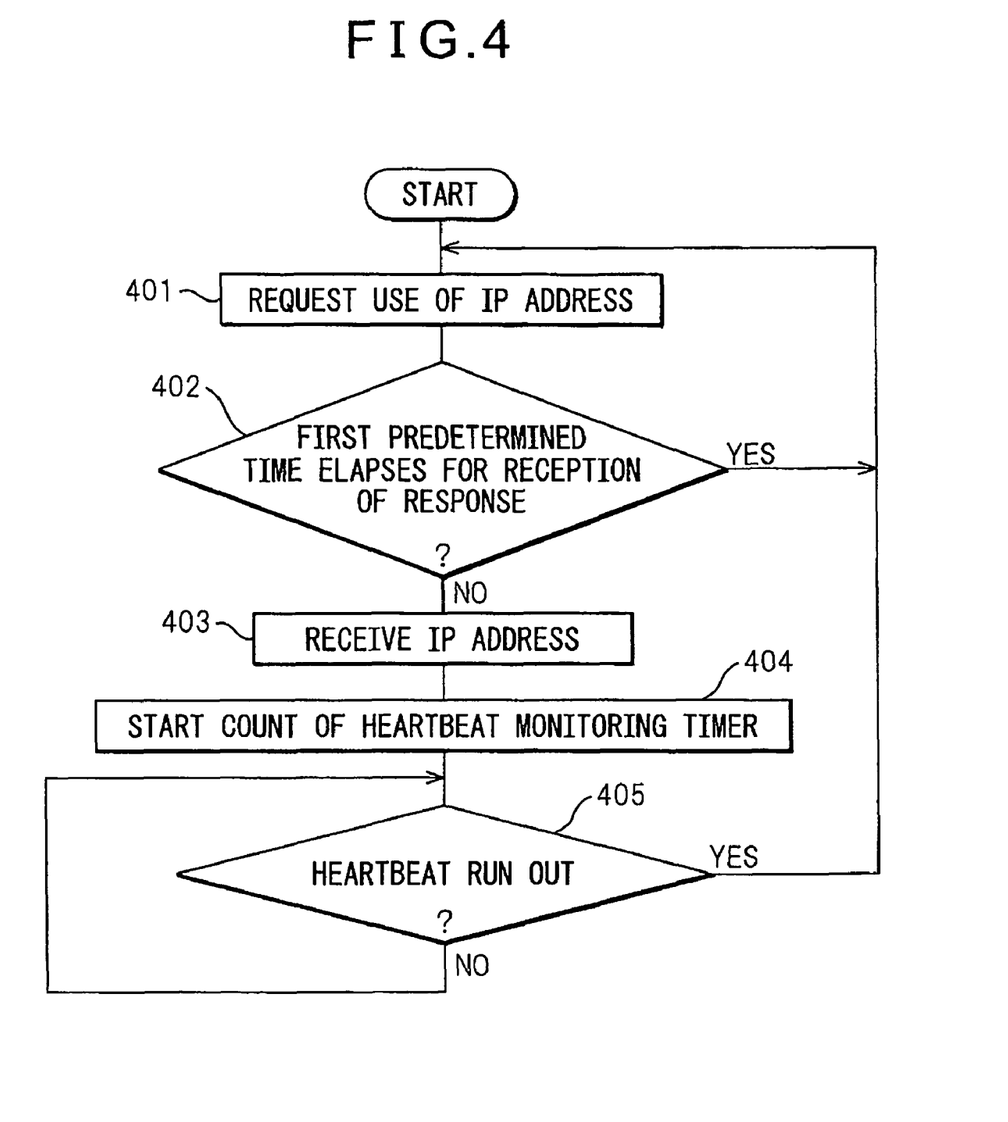
FIG. 4 is a flowchart depicting processing by an internal unit illustrated in FIG. 3.

FIG. 4 is a flowchart dipicting the processing by the internal unit illustrated in FIG. 3. Below, the processing of the internal unit 11 will be explained. In FIG. 4, steps 401 to 403 are processing by which the internal unit 11 communicates using the communication part 110 of the main unit 10 and the DHCP and thereby acquires an IP address. The processing of steps 401 to 403 is similar to steps 201 to 203 shown in FIG. 2, so the explanation will be omitted.

At step 403, the internal unit 11 receiving the IP address sends a heartbeat to the main unit 10 at regular intervals by the IP address loss processor 112 having the heartbeat monitoring timer 113. When sending a heartbeat, the IP address loss processor 112 starts the count of the heartbeat monitoring timer 113.

The main unit 10 receiving the heartbeat returns a response to the internal unit 11. The IP address loss processor 112 resets the count value of the heartbeat monitoring timer 113 by receiving a reply from the main unit 10.

If the external use address of the main unit 10 is changed and as a result there is a change in the internal use IP address of the main unit 10, a heartbeat sent to the internal use IP address before the change is not responded to. Therefore, the IP address loss processor 112 cannot return the count of the heartbeat monitoring timer 113 and the count of the heartbeat monitoring timer 113 exceeds a predetermined value.

When the count of the heartbeat monitoring timer 113 has not exceeded a predetermined value, it is determined that the heartbeat has not run out. As opposed to this, when the count of the heartbeat monitoring timer 113 exceeds a predetermined value, it is determined that the heartbeats have run out.

At step 405, the IP address loss processor 112 determines whether the heartbeat has run out by whether the count of the heartbeat monitoring timer 113 has exceeded a predetermined value.

When it is determined at step 405 that the heartbeat has run out, the routine proceeds to step 401. At step 401, the internal unit 11 sends a request for use of an IP address to the main unit 10 again. After step 402, the internal unit 11 receives a new IP address at step 403.

When, at step 405, the heartbeats has not run out, the routine proceeds to step 405 where step 405 is repeated.

In the present embodiment, the lifetime of the IP addresses assigned to the internal units 11 is set to endless, so it is possible to stop requests for updating of addresses by the internal units and possible to suppress unnecessary communication in the internal network. Further, it is possible to avoid loss of IP addresses due to a change in the real time clock of the storage system.

Figure 5:
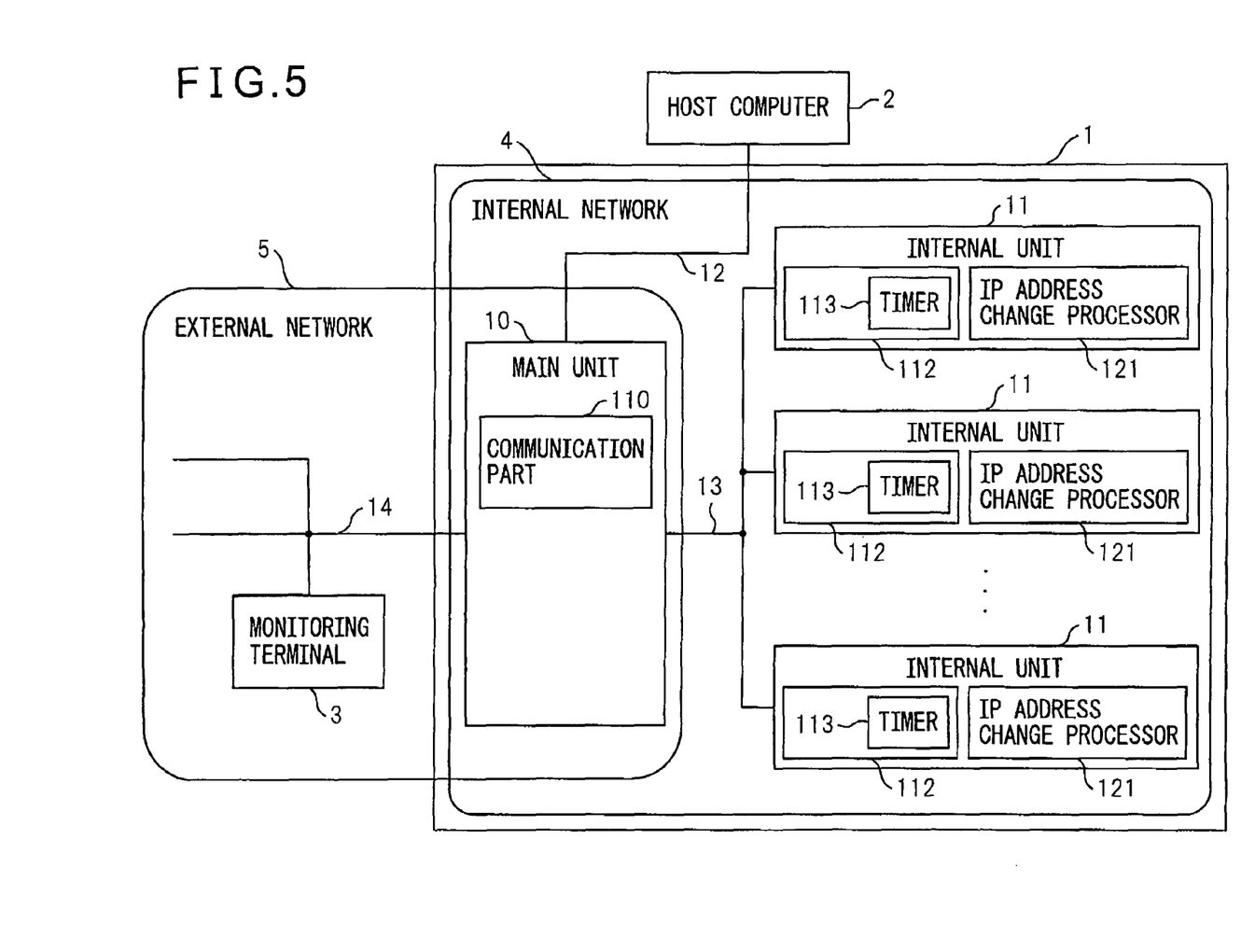
FIG. 5 is a schematic block diagram of an IP address distribution system according to a third embodiment.

FIG. 5 is a schematic block diagram of an IP address distribution system according to a third embodiment. In FIG. 5, components the same as those illustrated in FIG. 3 are assigned the same reference numerals. The configuration of the third embodiment depicted in FIG. 5 differs from the configuration of the second embodiment depicted in FIG. 3 in the point that each internal units 11 has an IP address change detector 121.

Figure 6:
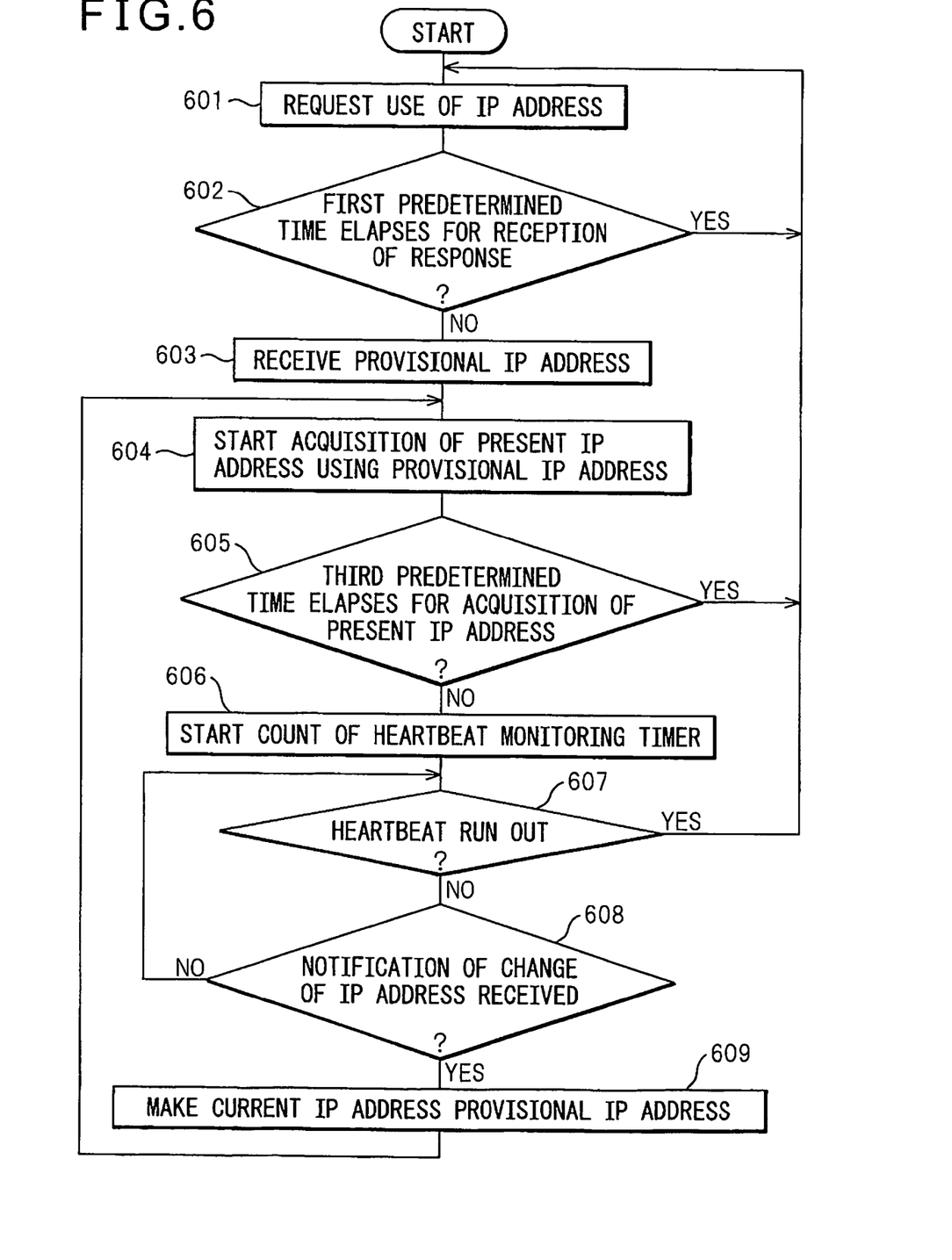
FIG. 6 is a flowchart depicting processing by an internal unit illustrated in FIG. 5.

FIG. 6 is a flowchart showing processing performed by an internal unit 11 shown in FIG. 5. The third embodiment assigns IP addresses to the internal units 11 under the control of the main unit 10. In FIG. 6, steps 601 to 603, 606, and 607 are processing performed by an IP address loss processor 112, while steps 604, 605, 608, and 609 are processing performed by an IP address change processor 121.

In the present embodiment, the main unit 10 assigns two IP addresses to each internal unit 11. The first IP address of the internal unit 11 is an IP address acquired by communication with the main unit 10 using the DHCP. The second IP address of the internal unit 11 is an address acquired without using DHCP by using the first address for communication with the main unit 10. The first IP address is used only for acquiring the second address, so can be called a "provisional address". As opposed to this, the second address is used pretty much for maintenance or monitoring with the main unit 10, so can be called a "main address".

Below, the processing of each internal unit 11 shown in FIG. 5 will be explained using the flowchart depicted in FIG. 6.

At step 601, the internal unit 11 sends a request for IP address use based on the DHCP to the main unit 10.

At step 602, if a response of the main unit 10 including the IP address is received by the internal unit 11 within a first predetermined time, the routine proceeds to step 603. When the response from the main unit 10 is not received from the internal unit 11 and a first predetermined time elapses, the internal unit returns to step 601 where it executes step 601 again. This is the same as the explanation using step 202 of the flowchart shown in FIG. 2, so the explanation will be omitted.

At step 603, the IP address received from the main unit 10 is made the provisional IP address of the internal unit 11, then the internal unit proceeds to step 604.

At step 604, the provisional IP address is used to start the acquisition of the main IP address of the internal unit 11. At step 605, it is determined if the main IP address of the internal unit 11 has successfully been obtained within a third predetermined time. Even if a third predetermined time elapses from the start of acquisition of the main IP address and the main IP address cannot be acquired, it is determined that the acquisition of the main IP address was unsuccessful. At this time, the internal unit returns to step 601 where it uses the DHCP to again send the main unit 10 a request for extension of use of an IP address. On the other hand, when the internal unit 11 acquires the main IP address within the third predetermined time from the start of acquisition of the main IP address, it is determined that the acquisition of the main IP address was successful and the routine proceeds to step 606. After the main IP address is acquired, the internal unit 11 and the main unit 10 communicate using the main IP address.

At step S606, when the main IP address is assigned to the internal unit 11, the IP address loss processor 112 of the internal unit 11 is used to send a heartbeat to the main unit 10 at predetermined intervals. After sending a heartbeat, the heartbeat monitoring timer 113 starts the count. The count of the heartbeat monitoring timer 113 is reset by the internal unit 11 receiving a response of a heartbeat from the main unit 10 sent from the main unit 10. When a heartbeat sent back from the main unit is not received by the internal unit 11 within a predetermined time, the count of the heartbeat monitoring timer 113 exceeds a predetermined value. When the count of the heartbeat monitoring timer 113 exceeds a predetermined value, it is determined at step S607 that the heartbeats have run out. When it is determined that the heartbeats have run out, the internal unit returns to step S601 where the DHCP is used for reacquisition of an IP address.

In this regard, in the third embodiment, heartbeat monitoring is not necessarily required. In the third embodiment, the fact of the IP address of the main unit 10 being changed is notified from the main unit 10 to the main IP address of the internal unit 11. Therefore, the internal unit 11 indicates that the main unit 10 has to change the IP address, so heartbeat monitoring need not be performed. The heartbeat monitoring in the third embodiment makes the detection of the loss of an IP address more reliable.

Therefore, in the third embodiment, when the IP address is changed, an IP address change notification is sent, so at the heartbeat monitoring of steps S606 and 607, it becomes extremely rare for running out of the heartbeats to be detected.

At step 608, it is determined if an IP address change notification of the main unit 10 sent from the main unit 10 has been received by the internal unit 10. If an IP address change notification has been received, the internal unit proceeds to step 609. If the internal unit 10 does not receive an IP address change notification, the internal unit returns to step 607 and repeatedly executes steps 607 and 608.

When the internal unit 11 receives an IP address change notification from the main unit 10, at step 609, the current main IP address of the internal unit 11 can also be used as the provisional IP address. Next, the internal unit 11 returns to step S604 where it uses the provisional address changed from the main address to start the acquisition of the new main address.

In the third embodiment, the internal unit 11 obtains the new main IP address using the current main IP address as a provisional IP address when an announcement of change of IP address is sent. Therefore, it is possible to change the IP address of the internal unit without heartbeat monitoring. Further, even if using heartbeat monitoring, it is possible to prevent the occurrence of a time period where monitoring is stopped.

Note that the provisional IP address is used only for the period until next acquiring the main IP address, so the lifetime of the provisional IP address by the DHCP can be freely set.

All examples and conditional language recited herein after intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. An address distribution system in a storage system, comprising:
  a main unit connected to an internal network in the storage system and having an internal address used in the internal network and an external address used in an external network; and
  a plurality of storage units each connected to the internal network, acquiring a first internal address from the main unit, using the acquired first internal address to acquire a second internal address from the main unit, and using the acquired second internal address to communicate with the main unit;
  wherein when a change of the external address is detected, the main unit sends the plurality of storage units an address change notification that requests each of the plurality of storage units to change the internal address used by each of the plurality of storage units, and when the plurality of storage units receive the address change notification, each storage unit uses the second internal address as the first internal address to acquire a new second address from the main unit, wherein each of the plurality of storage units has a heartbeat monitoring timer that monitors heartbeats between the main unit and the storage unit and when a counting value of the heartbeat monitoring timer is over a predetermined value, the storage unit starts to change the first internal address.

2. The address distribution system as set forth in claim 1, wherein each of the plurality of storage units sends the main unit a predetermined signal and, when not receiving a reply within a predetermined time, acquires a new first internal address from the main unit.

3. An address distribution method in an internal network connecting a main unit with a plurality of storage units, the main unit having an internal address used in the internal network and an external address used in an external network, each of the storage units achieving the method, comprising:

acquiring a first internal address from the main unit, using the acquired first address to acquire a second internal address from the main unit, using the acquired second internal address to communicate with the main unit, and, using the second internal address as the first internal address to acquire a new second internal address from the main unit, when receiving, from the main unit that detects a change of the external address, an address change notification that requests each of the plurality of storage units to change the internal address used by each of the plurality of storage units, wherein each of the plurality of storage units has a heartbeat monitoring timer that monitors heartbeats between the main unit and the storage unit, and further comprising: starting to change the first internal address when a counting value of heartbeat monitoring timer is over a predetermined value.

4. The address distribution method as set forth in claim 3, further comprising: sending a predetermined signal to the main unit and, acquiring a first internal address from the main unit, when not receiving a reply within a predetermined time.

* * * * *